United States Patent
Hu et al.

(10) Patent No.: US 11,711,019 B2
(45) Date of Patent: Jul. 25, 2023

(54) CONTROL DEVICE FOR POWER CONVERSION SYSTEM AND ITS CONTROL METHOD

(71) Applicant: Delta Electronics (Shanghai) Co., Ltd., Shanghai (CN)

(72) Inventors: Wenfei Hu, Shanghai (CN); Ling Shi, Shanghai (CN); Hong Liu, Shanghai (CN); Cheng Lu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/654,068

(22) Filed: Mar. 9, 2022

(65) Prior Publication Data

US 2022/0321014 A1 Oct. 6, 2022

(30) Foreign Application Priority Data

Apr. 1, 2021 (CN) .......................... 202110356821.9

(51) Int. Cl.
 *H02M 3/158* (2006.01)
 *H02M 3/24* (2006.01)
 (Continued)

(52) U.S. Cl.
 CPC ............. *H02M 3/24* (2013.01); *H02M 1/007* (2021.05); *H02M 1/0074* (2021.05); *H02M 1/14* (2013.01); *H02M 3/1586* (2021.05)

(58) Field of Classification Search
 CPC .. H02M 1/0003; H02M 1/0012; H02M 1/007; H02M 1/0074; H02M 1/14;
 (Continued)

(56) References Cited

U.S. PATENT DOCUMENTS

2016/0065077 A1 3/2016 Yamada
2018/0219469 A1* 8/2018 Yamashita ........ H02M 7/53871
(Continued)

FOREIGN PATENT DOCUMENTS

| CN | 106655794 A | 5/2017 |
| CN | 111193278 A | 5/2020 |
| JP | 2001016859 A | 1/2001 |

OTHER PUBLICATIONS

Gateau G et al., "Digital Decentralized Current Control for Parallel Multiphase Converter," 2019 IEEE International Conference on Industrial Technology (ICIT), Feb. 13, 2019 (Feb. 13, 2019), pp. 1761-1766.

(Continued)

*Primary Examiner* — Thienvu V Tran
*Assistant Examiner* — Shahzeb K Ahmad
(74) *Attorney, Agent, or Firm* — CKC & Partners Co., LLC

(57) ABSTRACT

A method for controlling a power conversion system includes: configuring a carrier period of the power modules, and configuring a phase shift of carrier waves of the adjacent power modules to be $2\pi/N$; selecting M power modules to operate within the carrier period, where $0 \leq M \leq N$, and providing a modulation wave to the power modules, an amplitude of the modulation wave being A/N of a carrier peak of the carrier waves; and comparing the value of the modulation wave with a value of the carrier wave of each of the power modules, respectively, wherein, when the value of the modulation wave is greater than the value of the carrier wave, the corresponding power module runs; when the value of the modulation wave is less than or equal to the value of the carrier wave, the corresponding power module stops.

20 Claims, 9 Drawing Sheets one-stage power modules

(51) Int. Cl.
*H02M 1/00* (2006.01)
*H02M 1/14* (2006.01)

(58) Field of Classification Search
CPC ............ H02M 1/15; H02M 1/42; H02M 3/24;
H02M 3/01; H02M 3/156; H02M 3/158;
H02M 3/1586; H02M 3/335; H02M
3/337; H02M 7/155; H02M 7/4835
See application file for complete search history.

(56) References Cited

U.S. PATENT DOCUMENTS

| | | |
|---|---|---|
| 2019/0319548 A1 | 10/2019 | Nakahara et al. |
| 2019/0334442 A1 | 10/2019 | Iyasu et al. |
| 2020/0227919 A1* | 7/2020 | Yuan ........................ H02J 3/38 |
| 2021/0021189 A1* | 1/2021 | Sato .................. H02M 7/53873 |
| 2021/0249971 A1* | 8/2021 | Inomata .............. H02M 1/0054 |
| 2022/0052620 A1* | 2/2022 | Du ...................... H02M 1/0043 |

OTHER PUBLICATIONS

Cousineau Marc et al., "Interleaved converter with massive parallelization of high frequency GaN switching-cells using decentralized modular analog controller," 2015 IEEE Energy Conversion Congress and Exposition (ECCE), Sep. 20, 2015 (Sep. 20, 2015), pp. 4343-4350.
Sinha Mohit et al., "Decentralized Interleaving of Parallel-connected Buck Converters," IEEE Transactions on Power Electronics, Institute of Electrical, and Electronics Engineers, USA, vol. 34, No. 5, May 1, 2019 (May 1, 2019), pp. 4993-5006.

* cited by examiner one-stage power modules two-stage power modules

CONTROL DEVICE FOR POWER CONVERSION SYSTEM AND ITS CONTROL METHOD

CROSS-REFERENCE TO RELATED APPLICATIONS

This non-provisional application claims priority under 35 U.S.C. § 119(a) on Patent Application No. 202110356821.9 filed in P.R. China on Apr. 1, 2021, the entire contents of which are hereby incorporated by reference.

Some references, if any, which may include patents, patent applications, and various publications, may be cited and discussed in the description of this disclosure. The citation and/or discussion of such references, if any, is provided merely to clarify the description of the present disclosure and is not an admission that any such reference is "prior art" to the disclosure described herein. All references listed, cited, and/or discussed in this specification are incorporated herein by reference in their entireties and to the same extent as if each reference was individually incorporated by reference.

BACKGROUND OF THE DISCLOSURE

1. Field of the Disclosure

The disclosure relates to the field of power electronic technology, and particularly to a control device for a power conversion system and its control method.

2. Related Art

With progress of the distributed new energy power generation technology and increasing of the DC power devices, the demand for DC distribution, such as, high power storage power conditioning system (PCS), electric vehicle superfast charging station, rail transportation, medium voltage power electronic transformer (MV-PET) system, or the like, is growing. Due to the power limit of a single module, a plurality of modules shall often be parallel combined (at least one port being connected in parallel) to realize applications with a low voltage and a large current on DC side. FIGS. 1A-1C illustrate structures of parallel combination systems such as a Solid State Transformer (SST), an Input Series Output Parallel (ISOP) DC/DC converter, an Input Parallel Output Parallel (IPOP) DC/DC converter, or the like.

To reduce switching loss, improve efficiency, and reduce gain, the DC/DC converter is often in a burst mode under a light load, such as, an LLC resonant converter, as shown in FIG. 1D. If the DC/DC module is controlled separately without coordination, when the respective DC/DC converters start and stop simultaneously under the light load, the output voltage has a large ripple and large output capacitors are needed.

Since inherent loss such as switching loss, driving loss and conduction loss under the light load takes large proportion of a total loss of the isolated resonant DC/DC converter, efficiency of the isolated resonant DC/DC converter is low under the light load, as shown in FIG. 1E. Currently, most of the modularized parallel converters adopt a power sharing mode, i.e., no matter whether operating in a full power, all modules evenly share the system power, causing that the respective modules are operated at a low power under a light load mode, with low efficiency. Therefore, in the case of a light load, if system loss can be reduced, it may facilitate to enhance an overall operating efficiency of the system.

As for the Input Series Output Parallel (ISOP) system, conventional technology has problems such as input voltage unbalance, high requirement for communication rate, unequal operating time of all modules, inconsistency of aging degree of all modules, and so on.

SUMMARY OF THE DISCLOSURE

An object of the disclosure is to provide a control device for a power conversion system and its control method, which can solve one or more shortcomings in the prior art.

To realize the object, according to one embodiment of the disclosure, the disclosure provides a method for controlling a power conversion system, wherein the power conversion system comprises N power modules connected in parallel, where N is a positive integer, the method comprising:

step S1, configuring a carrier period of the N power modules, and configuring carrier waves of any adjacent power modules to shift $2\pi/N$ with respect to each other;

step S2, selecting M power modules to run within the carrier period, where $0 \leq M \leq N$, and providing a modulation wave to the N power modules, an amplitude of the modulation wave being A/N of a carrier peak of the carrier waves, wherein when the power conversion system is in a steady state, A=M, and when the power conversion system is not in a steady state, M is equal to A after rounding;

step S3, comparing the value of the modulation wave with a value of the carrier wave of each of the power modules, respectively, wherein, when the value of the modulation wave is greater than the value of the carrier wave, the corresponding power module runs; and when the value of the modulation wave is less than or equal to the value of the carrier wave, the corresponding power module stops.

According to another embodiment of the disclosure, the disclosure further provides a control device for a power conversion system, wherein the power conversion system comprises N power modules connected in parallel, where N is a positive integer, wherein the control device comprises at least one control unit for controlling the N power modules, wherein the at least one control unit comprises:

a carrier generating unit for generating N carrier waves, wherein a phase shift between the carrier waves of any adjacent power modules is $2\pi/N$;

a module number selecting unit for selecting M power modules to run within a carrier period of the N power modules, where $0 \leq M \leq N$, and providing a modulation wave to the N power modules, an amplitude of the modulation wave being A/N of a carrier peak of the carrier waves, wherein when the power conversion system is in a steady state, A=M, and when the power conversion system is not in a steady state, M is equal to A after rounding; and a comparing unit for comparing the value of the modulation wave with a value of the carrier wave of each of the power module respectively, wherein when the value of the modulation wave is greater than the value of the carrier wave, the corresponding power module runs, and when the value of the modulation wave is less than or equal to the value of the carrier wave, the corresponding power module stops.

The additional aspects and advantages of the disclosure are partially explained in the below description, and partially becoming apparent from the description, or can be obtained through the practice of the disclosure.

BRIEF DESCRIPTION OF THE DRAWINGS

The exemplary embodiments are described in detail with reference to the accompanying drawings, through which the above and other features and advantages of the disclosure will become more apparent.

FIGS. 4A and 4B are schematic diagrams of switching stages of the modules when a two-stage converter is alternatively switched according to the disclosure, wherein FIG. 4A is one-stage switching, and FIG. 4B is two-stage switching.

DETAILED EMBODIMENTS OF THE DISCLOSURE

Figure 1A:
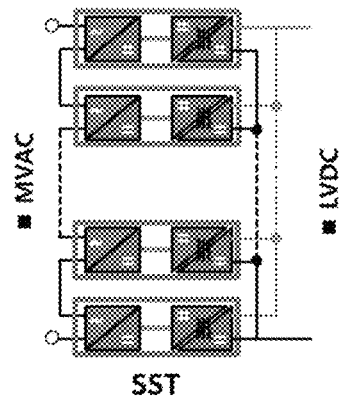
FIGS. 1A, 1B, and 1C are structural diagrams of parallel combination systems such as SST, ISOP DC/DC, IPOP DC/DC in the prior art.
Figure 1B:
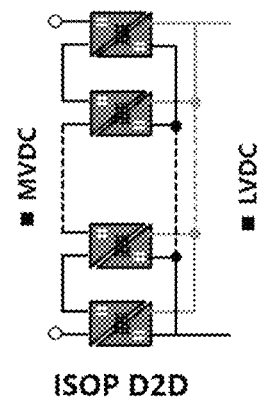
Figure 1C:
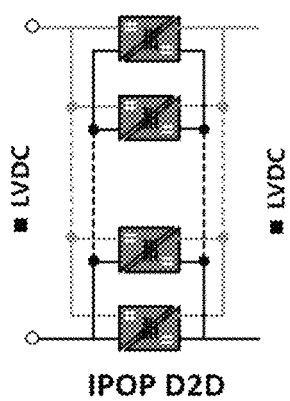
Figure 1D:
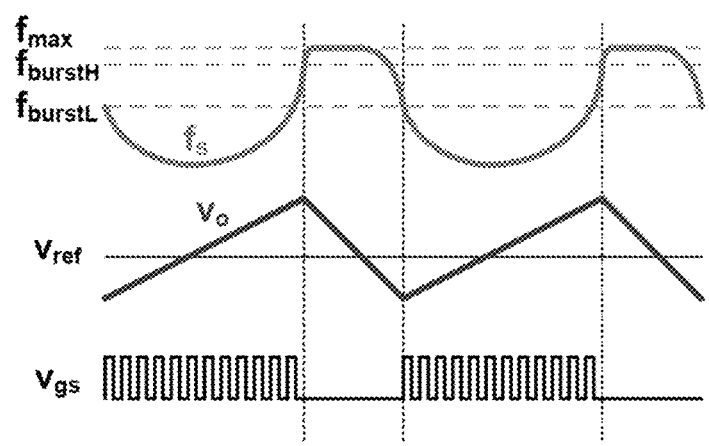
FIG. 1D is a schematic diagram illustrating the operating state of a conventional isolated resonant DC/DC converter in a burst mode under light load.
Figure 1E:
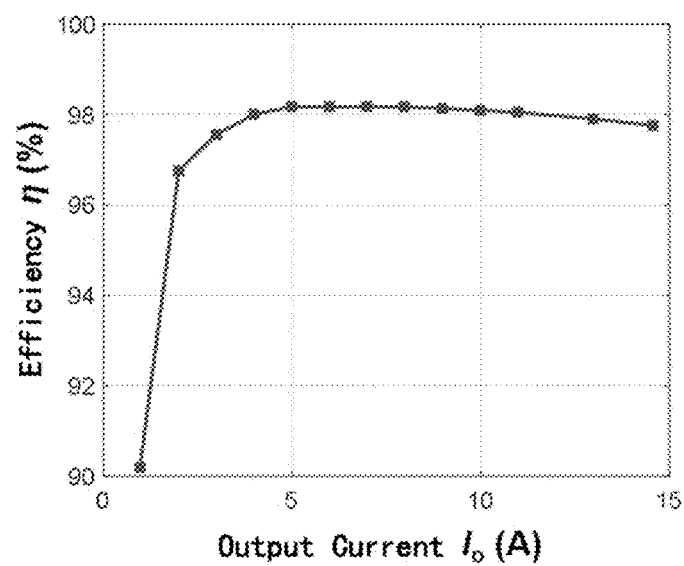
FIG. 1E is a schematic diagram illustrating the efficiency of the conventional isolated resonant DC/DC converter.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that the disclosure will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said", and "at least one" refer to one or more factors/components/the like. The terms "include", "comprise", and "have" refer to an open and included meaning and refer to additional factors/components/the like, in addition to the listed factors/components/the like. The embodiments may use relative phrases, such as, "upper" or "lower" to describe a relative relation of one signed component over another component. It shall be understood that if the signed device reverses to turn upside down, the described component on an "upper" side will become a component on a "lower" side. In addition, the terms "first", "second" and the like in the claims are only used as signs, instead of numeral limitations to objects.

Figure 2:
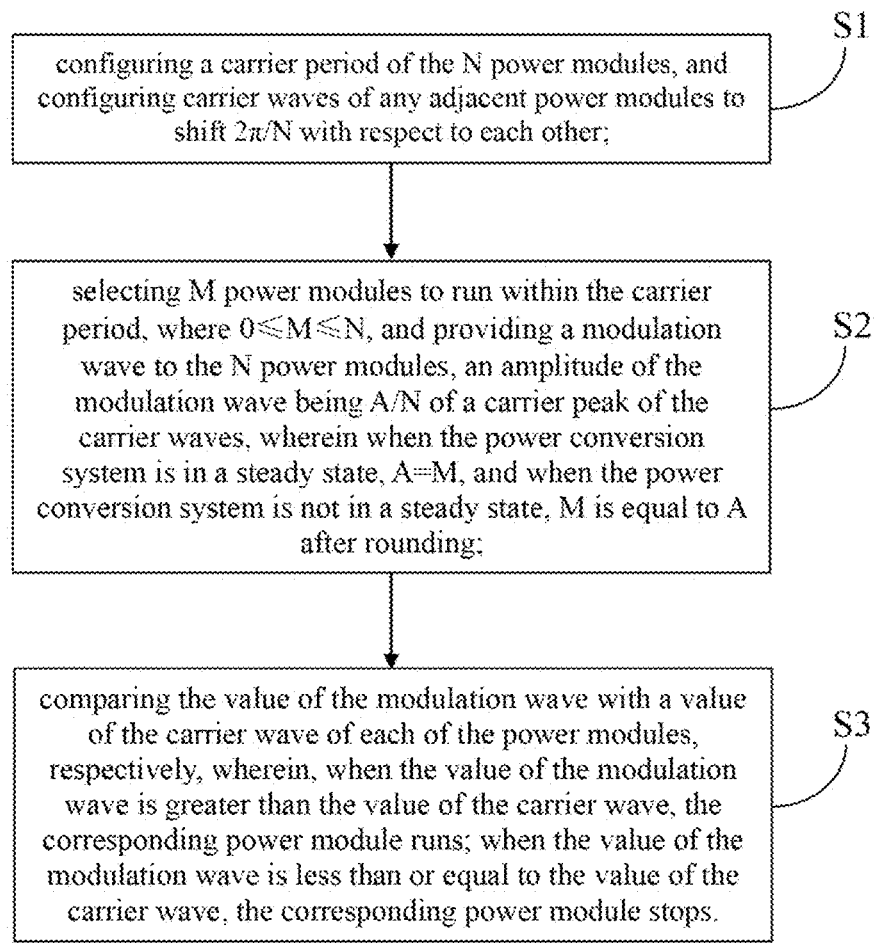
FIG. 2 is a schematic diagram of a control method for a power conversion system according to the disclosure.

The disclosure provides a method for controlling a power conversion system, wherein the power conversion system is a parallel combination system, comprising N power modules connected in parallel for example, where N is a positive integer. Each of the power modules may comprise a first port, and the first ports of these power modules are connected in parallel. In the disclosure, the parallel combination system may be, but not limited to a system such as SST, ISOP, IPOP, or the like. In the disclosure, as shown in FIG. 2, the control method comprises:

step S1, configuring a carrier period of the N power modules, and configuring carrier waves of any adjacent power modules to shift $2\pi/N$ with respect to each other;

step S2, selecting M power modules to run within the carrier period, where $0 \leq M \leq N$, and providing a modulation wave to the N power modules, an amplitude of the modulation wave being A/N of a carrier peak of the carrier waves, wherein when the power conversion system is in a steady state, A=M, and when the power conversion system is not in a steady state, M is equal to A after rounding;

step S3, comparing the value of the modulation wave with a value of the carrier wave of each of the power modules, respectively, wherein, when the value of the modulation wave is greater than the value of the carrier wave, the corresponding power module runs; and when the value of the modulation wave is less than or equal to the value of the carrier wave, the corresponding power module stops.

In the disclosure, a running time for each power module is the same within one carrier period. Moreover, when one power module is selected to run, it is, for example, in a burst mode.

Figures 3A, 3B, 3C:
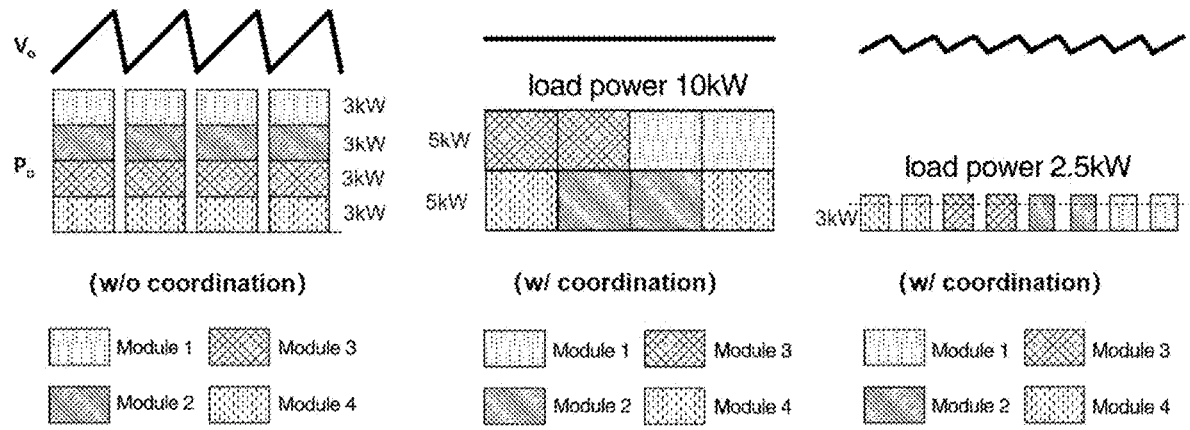
FIGS. 3A, 3B, and 3C are schematic diagrams illustrating technical effects of a coordination control method of a power conversion system in different operating states under different system load according to the disclosure.

FIGS. 3A, 3B, and 3C illustrate technical effects of a coordination control method in different operating states under different system load according to the disclosure. Explanations are made by taking four DC/DC modules with a rated power of 15 kW connected in parallel as an example and assuming that a single module enters a burst mode under 3 kW. As shown in FIG. 3A, if the power of the load is 10 kW, and the operations are decentralized controlled, i.e., without coordination control method, all power modules enter the burst mode, and a large ripple of an output voltage is resulted when the respective modules run and stop simultaneously. As shown in FIG. 3B, if a coordination control method is enabled to operate the modules alternatively, with only two of the modules operating at each time and each module taking a power of 5 kW, all power modules do not enter the burst mode, so that a total power of the entire system is continuous and the ripple of the output voltage is reduced. As shown in FIG. 3C, when the power of the load is 2.5 kW, which is less than a power of a single module when entering the burst mode, only one module is enabled to operate alternatively at a time. Although the total power of the system is discontinuous through alternative operation, a fluctuating power is reduced to ¼, and a ripple of the voltage is reduced to ¼ with the same output filter capacitor. Different patterns in the figures represent different power modules, and different patterns on the same longitudinal axis represent the power modules working simultaneously. As can be seen, through coordination control operation, the number of operating modules at the same time in the disclosure is also decreased as the power is reduced, so the system can always work in a high efficient area.

Figure 3D:
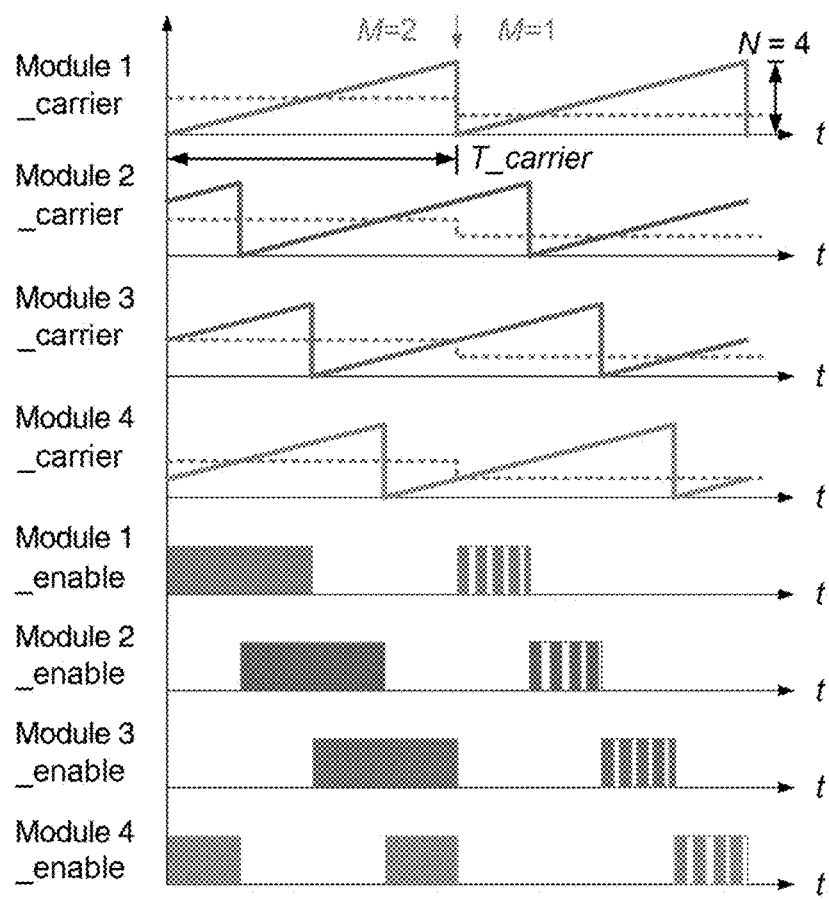
FIG. 3D is a schematic diagram of a method for controlling coordination operation of N power modules according to the disclosure.

Hereinafter the method for controlling coordination operation of a power conversion system in the disclosure is explained in detail. As shown in FIG. 3D, firstly, a carrier period T_carrier is selected, a peak amplitude of the carrier is configured to be N (N is a total number of the power modules), and the carrier waves of the adjacent power modules are configured to shift $2\pi/N$ with respect to each other. For example, in FIG. 3D there are four power modules, i.e., Module 1-Module 4, wherein solid lines in the preceding four waveforms represent the carrier waves of the corresponding Modules. The adjacent power modules may be adjacent in any way. For example, the power modules may be numbered arbitrarily, and the adjacent power modules refer to power modules numbered adjacently. Next, M ($1 \leq M \leq N$) modules are selected to run, and amplitude of the modulation wave is M. For example, in the embodiment shown in FIG. 3D, in the first carrier period T_carrier, two power modules are selected to run, and in the next carrier period T_carrier, one power module is selected to run. Dotted lines in the preceding four waveforms represent the modulation waves. When the modulation wave is greater than the carrier wave, the corresponding module runs, i.e., is switched-in, and when the modulation wave is less than the carrier wave, the corresponding module stops, i.e., is switched-out. In FIG. 3D, an enable signal of each module being 1 represents that the corresponding modules are switched-in, and the enable signal being 0 represents that the corresponding modules are switched-out. Accordingly, alternation of the modules can be realized automatically by using the phase shift of the carrier waves, and an alternating period can be configured flexibly by the carrier period. Moreover, the method has a low requirement for a communication rate and can be implemented by either a centralized controller or a distributed controller. Meanwhile, alternative operation of the modules avoids inconsistency of aging degrees of the respective modules. As for the ISOP system, a high-speed switching can ensure dc-link voltage balance.

Figure 4A:
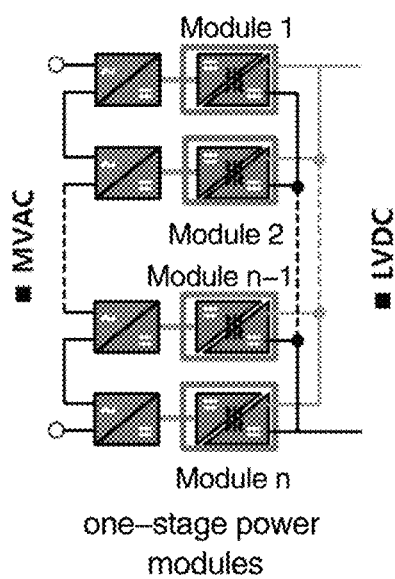
Figure 4B:
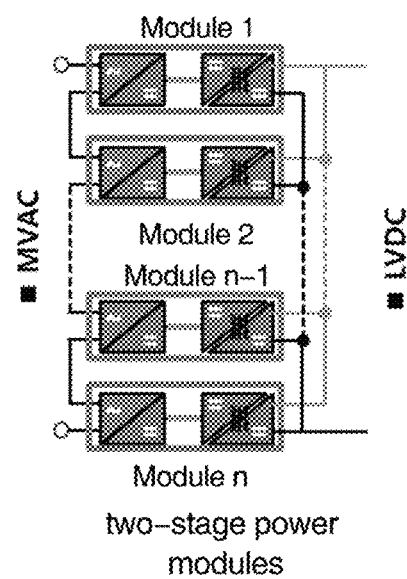

In one embodiment of the disclosure, each of the power modules may be a one-stage power module having one-stage power conversion units. In other embodiments, each of the power modules may also be a two-stage power module having first-stage power conversion units and second-stage power conversion units in cascade connection. Moreover, when the power modules run or stop, either the first-stage power conversion units or the second-stage power conversion units run or stop, or both the first-stage power conversion units and the second-stage power conversion units run or stop simultaneously. As shown in FIGS. 4A and 4B, with respect to a two-stage converter, alternative switching can be realized by only one stage. For example, only alternative switching second-stage DC/DC units of the respective modules Module 1-Module n in FIG. 4A. For another example, switching first-stage A2D units and the second-stage DC/DC units of the respective modules Module 1-Module n simultaneously in FIG. 4B.

In the disclosure, to optimize system efficiency and reduce the ripple of the output voltage, the number M of the running modules may also be optimized. In other words, in the step S2, a method for selecting the number M of the running power modules may, for example, comprise: firstly, determining a best efficiency point (BEP) power $P_{opt}$ corresponding to the BEP of the power modules; secondly, calculating a ratio of a total system power $P_o$ of the power conversion system to the BEP power $P_{opt}$ and rounding the ratio to obtain a calculated operating value $M_{cal}$; and then, determining the number $M=M_{cal}$ or $M_{cal}+1$ of the running power modules according to a principle that an operating power of individual module is closest to the BEP.

An algorithm for determining the number M of the running power modules is as follows:

$$M_{cal} = \text{floor}\left(\frac{P_o}{P_{opt}}\right), \text{ wherein if}$$

$$\left|P_{opt} - \frac{P_o}{M_{cal}}\right| > \left|P_{opt} - \frac{P_o}{(M_{cal}+1)}\right|, \text{ then}$$

$$M = M_{cal} + 1, \text{ or } M = M_{cal}.$$

Explanations are made by taking 15 kW*4 modules as an example and assuming a BEP power $P_{opt}$=7.5 kW, the best efficiency range being from 5 kW to 10 kW, and a power entering the Burst mode being $P_{burst}$=3 kW. The operating number corresponding to the total power range can be obtained from the above optimization algorithm. As shown in Table 1, as the power is reduced, the operating number is decreased to ensure that the respective modules work near the BEP when the power of the respective modules is 10 kW or more, and after the coordination control method of the disclosure is adopted, a threshold power when the system enters the burst mode is reduced from 12 kW to 3 kW.

TABLE 1

Example of Optimizing Operating Number

| Total Power Range | Operating Number | Power Range of Single Module | System |
|---|---|---|---|
| 25.7 kW~60 kW | Four simultaneously | 6.43 kW~15 kW | System operates continuously |
| 18 kW~25.7 kW | Three alternatively | 6 kW~8.57 kW | System operates continuously |
| 10 kW~18 kW | Two alternatively | 5 kW~9 kW | System operates continuously |
| 3 kW~10 kW | One alternatively | 3 kW~10 kW | System operates continuously |
| 0 kW~3 kW | One alternatively | 0 kW~3 kW | Burst mode |

Figure 5:
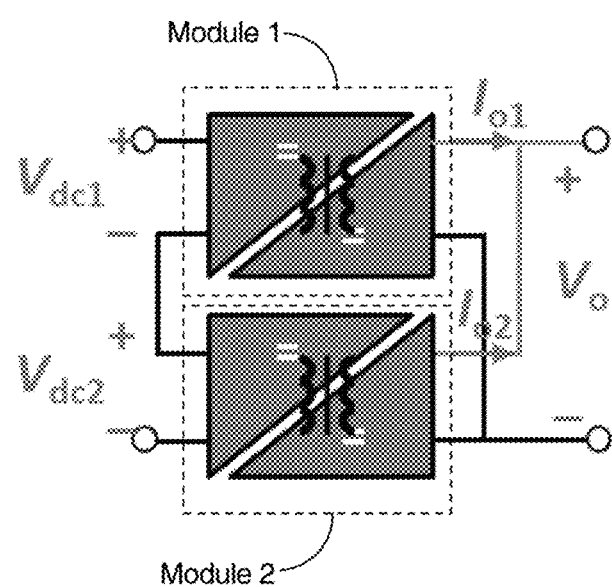
FIG. 5 is a schematic diagram of a simulation model when simulation is made taking Input Series Output Parallel (ISOP) of two modules as an example according to the disclosure.
Figure 6:
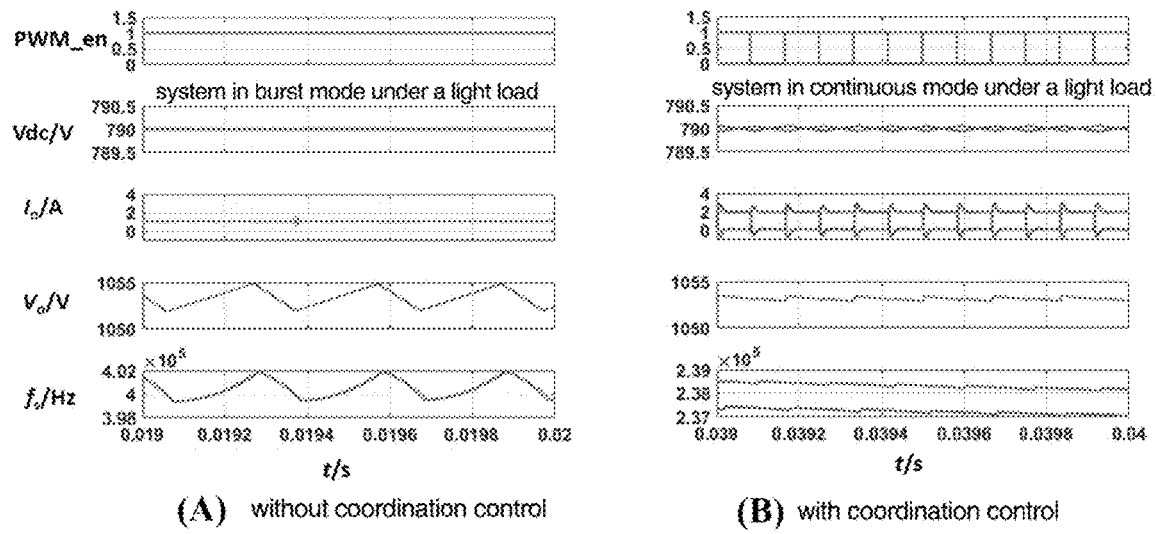
FIG. 6 is a schematic diagram of simulation results when the simulation model shown in FIG. 5 under light load is without coordination control (A) and with coordination control (B).
Figure 7:
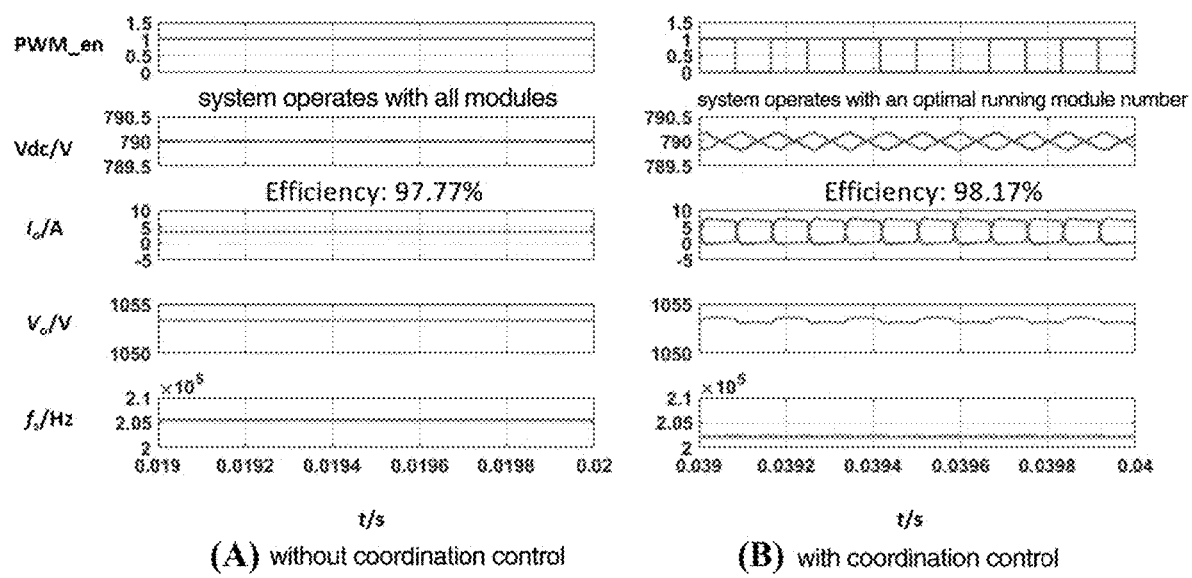
FIG. 7 is a schematic diagram of simulation results when the simulation model shown in FIG. 5 under heavy load is without coordination control (A) and with coordination control (B).

Simulation is made by taking Input Series Output Parallel (ISOP) of two modules Module1 and Module2 as an example, and simulation model is shown in FIG. 5. Simulation results are shown in FIGS. 6 and 7, wherein PWM_en is a switching signal of the modules Module1 and Module2, 1 stands for switching-in, and 0 stands for switching-out; $V_{dc}$ stands for input voltages $V_{dc1}$ and $V_{dc2}$ of the two modules, $i_o$ stands for output currents $i_{o1}$ and $i_{o2}$ of the two modules, $V_o$ is an output voltage, and $f_s$ stands for switching frequencies $f_{s1}$ and $f_{s2}$ of the two modules. Load conditions in left FIG.(A) and right FIG. (B) of FIG. 6 are the same, and the load is light (i.e., a light load). Without a coordination control, as shown in the left FIG. (A), both two modules Module 1 and Module 2 run, so that the power of each module is low, the modules are in the burst mode, and the ripple of the output voltage $V_o$ is large. With the coordination control, as shown in right FIG. (B), the Module 1 and the Module 2 are operated alternatively, so that the power of each module is increased, the operating state of the system is changed from burst mode to continuous mode, and the ripple of the output voltage $V_o$ is reduced. Load conditions in left FIG. (A) and right FIG. (B) of FIG. 7 are the same, and the load is heavier (i.e., a heavy load). Without a coordination control, as shown in the left FIG. (A), the system is in continuous mode, but the Module 1 and the Module 2 are operated simultaneously, so that output powers of the respective modules are low, resulting a low system efficiency. With the coordination control, as shown in right FIG. (B), the number of the operating modules is optimized, i.e., the two modules are operated alternatively, so that the power of the single module is increased, resulting an improved system operating efficiency.

Figure 8:
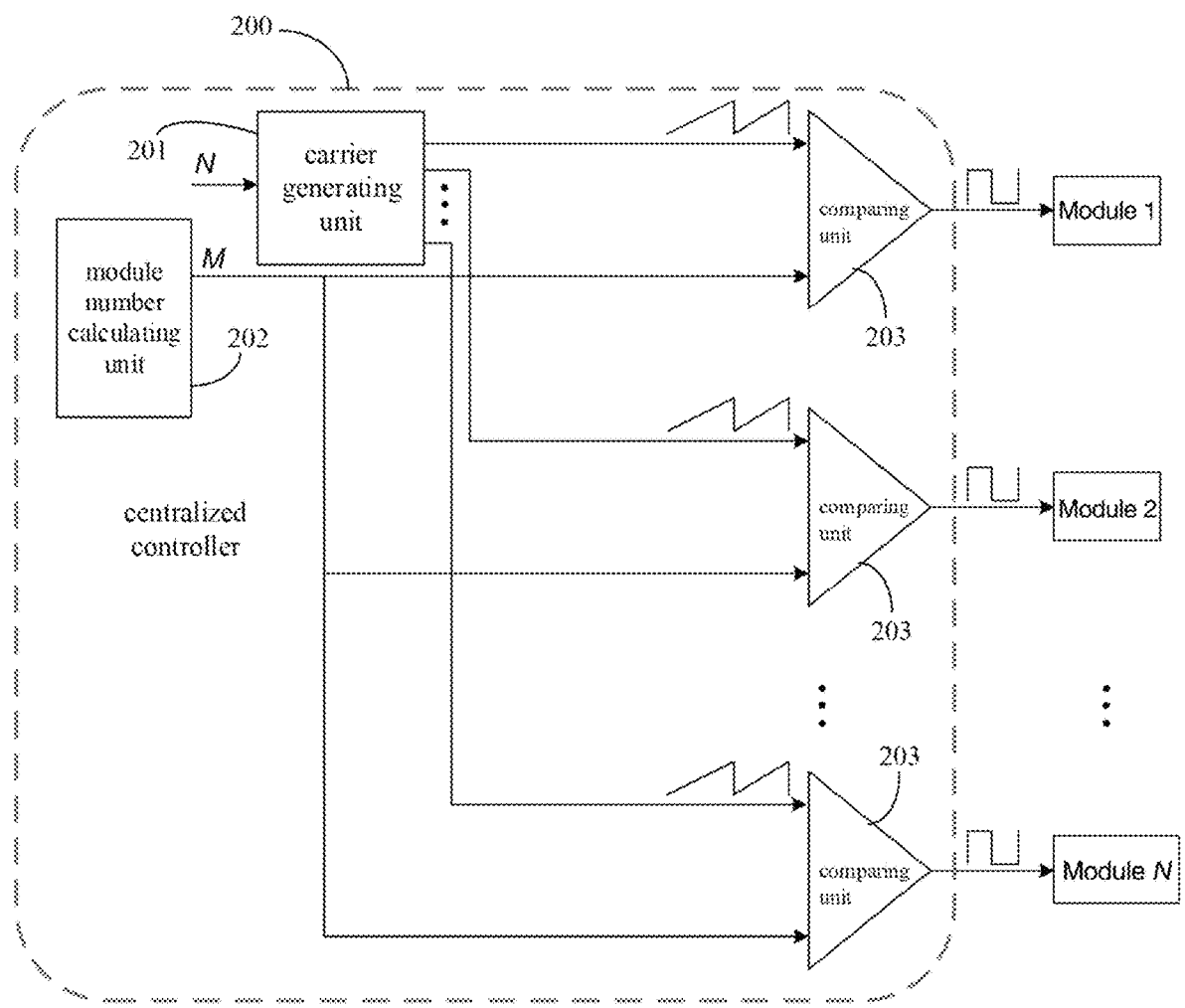
FIG. 8 is a structural diagram when a control device for a power conversion system realizes centralized coordination operation by using a centralized controller according to the disclosure.

FIG. 8 is a structural diagram of a control device for a power conversion system realizing centralized coordination operation according to the disclosure. The power conversion system may comprise, for example, N power modules Module1 to Module N, and the control device may comprise, for example, a control unit 200 configured, for example, to be a centralized controller for centralized controlling these power modules Module 1 to Module N. Drive signals of the respective modules are all generated in the centralized controller, and the centralized controller may, for example, generate N carrier waves having a phase shift of 2π/N according to the total number N of the present power modules by a carrier generating unit 201, calculate the number M of the running power modules and generate the modulation wave by a module number calculating unit 202, and compare the modulation wave with the carrier waves to generate corresponding drive signals (PWM_en) to be sent to the corresponding power modules Module1 to ModuleN by a comparing unit 203.

Figure 9:
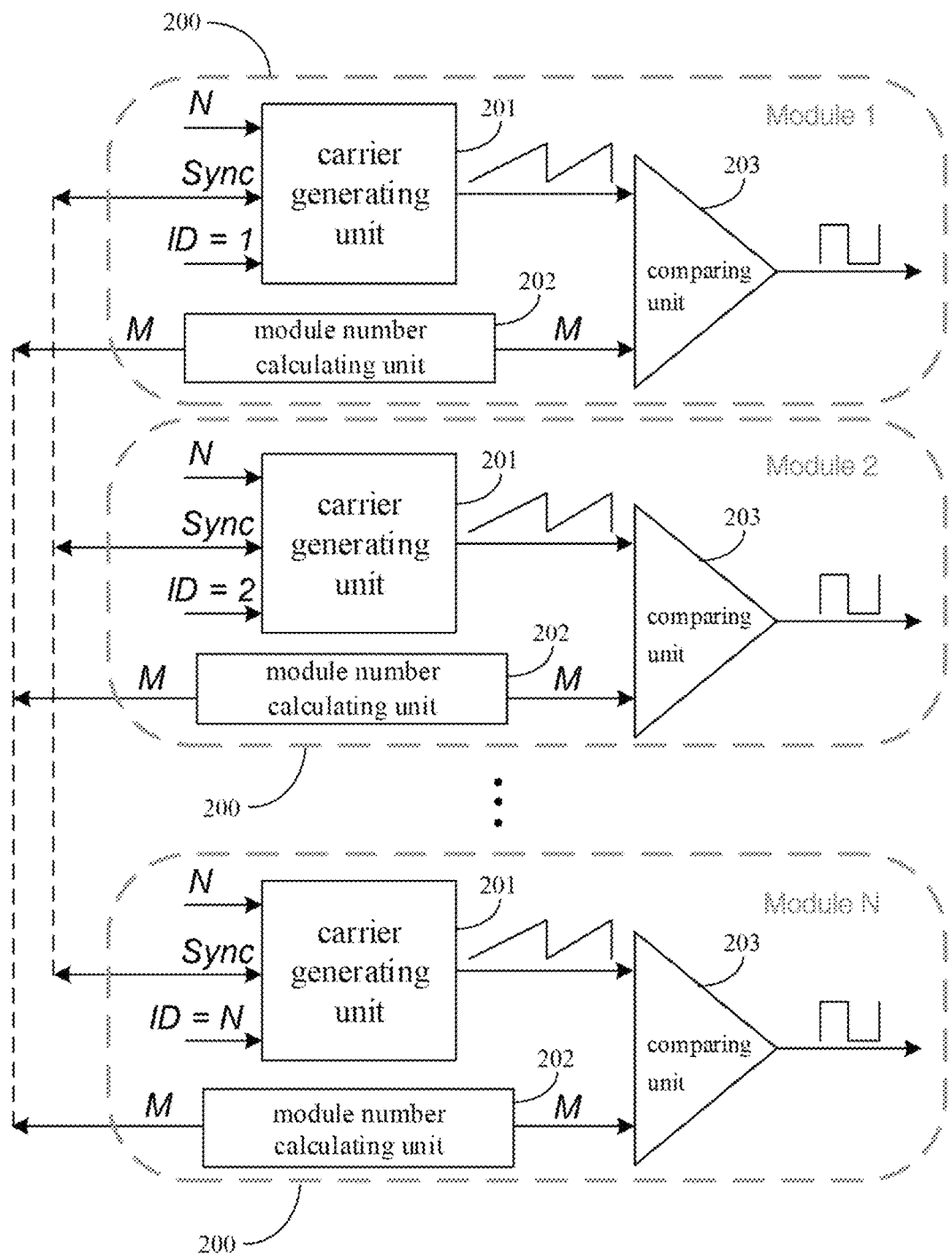
FIG. 9 is a structural diagram when a control device for a power conversion system realizes distributed coordination operation by using a plurality of control chips according to the disclosure.

FIG. 9 illustrates a structure of a control device for a power conversion system realizing distributed coordination operation according to the disclosure. The power conversion system may comprise, for example, N power modules Module1 to ModuleN, and the control device may comprise, for example, N control units 200 configured, for example, to comprise a plurality of control chips distributed in the respective power modules. The control units generate N carrier waves having a phase shift of 2π/N according to ID numbers of power modules, synchronizing signals Sync of the modules, and the total number N by the carrier generating unit 201, determine the number M of the running power modules and generate the modulation wave according to local calculation or communication by the module number calculating unit 202, and compare the modulation wave with the carrier waves to generate corresponding drive signals (PWM_en) by the comparing unit 203. The synchronizing signals Sync among the modules can be obtained by communication.

Correspondingly, the disclosure may provide a device for controlling a power conversion system, comprising at least one control unit for controlling N power modules. The at least one control unit may comprise: a carrier generating unit for generating N carrier waves, wherein a phase shift between the carrier waves of any adjacent power modules is 2n/N; a module number selecting unit for selecting M power modules to run within a carrier period of the N power modules, where 0≤M≤N, and providing a modulation wave to the N power modules, an amplitude of the modulation wave being A/N of a carrier peak of the carrier waves, wherein when the power conversion system is in a steady state, A=M, and when the power conversion system is not in a steady state, M is equal to A after rounding; and comparing the value of the modulation wave with a value of the carrier wave of each of the power module respectively, wherein when the value of the modulation wave is greater than the value of the carrier wave, the corresponding power module runs, and when the value of the modulation wave is less than or equal to the value of the carrier wave, the corresponding power module stops.

In one embodiment of the disclosure, a running time for each power module is the same within one carrier period.

In one embodiment of the disclosure, the module number selecting unit determines a best efficiency point (BEP) power $P_{opt}$ corresponding to the BEP of the power modules; calculates a ratio of a total system power $P_o$ of the power conversion system to the BEP power $P_{opt}$ and round the ratio to obtain a calculated operating value $M_{cal}$; and determines the number $M=M_{cal}$ or $M_{cal}+1$ of running power modules according to a principle that an operating power of an individual power module is closest to the BEP.

In one embodiment of the disclosure, an algorithm for determining the number M of the running power modules by the module number selecting unit is as follows:

$$M_{cal} = \text{floor}\left(\frac{P_o}{P_{opt}}\right), \text{ wherein if}$$

$$\left|P_{opt} - \frac{P_o}{M_{cal}}\right| > \left|P_{opt} - \frac{P_o}{(M_{cal}+1)}\right|,$$

$$M = M_{cal} + 1, \text{ or } M = M_{cal}.$$

In one embodiment of the disclosure, each of the power modules may comprise a first port, and the first ports of the N power modules are connected in parallel.

In one embodiment of the disclosure, each of the power modules is a one-stage power module having one-stage power conversion units.

In one embodiment of the disclosure, each of the power modules is a two-stage power module having first-stage power conversion units and second-stage power conversion units in cascade connection, wherein when the power modules run or stop, either the first-stage power conversion units or the second-stage power conversion units run or stop, or both the first-stage power conversion units and the second-stage power conversion units run or stop simultaneously.

In one embodiment of the disclosure, when one power module is selected to run, it is in a burst mode.

In one embodiment of the disclosure, the at least one control unit is configured to be a centralized controller, wherein the centralized controller is configured to generate N carrier waves having a phase shift of 2π/N according to the total number N of the present power modules by the carrier generating unit, calculate the number M of running power modules and generate the modulation wave by the module number calculating unit, and compare the modulation wave with the carrier waves to generate corresponding drive signals and send the generated drive signals to respective power modules by the comparing unit.

In one embodiment of the disclosure, the at least one control unit is configured to comprise a plurality of control chips distributed in the respective power modules, wherein the control chips generate N carrier waves having a phase shift of 2π/N according to ID numbers of power modules, synchronizing signals of the modules, and the total number N by the carrier generating unit, determine the number M of running power modules and generate the modulation wave according to local calculation or communication by the module number calculating unit, and compare the modulation wave with the carrier waves to generate corresponding drive signals by the comparing unit.

As for the power conversion system comprising N power modules connected in parallel, the control method of the disclosure improves system efficiency, and reduces an output voltage ripple and an output current ripple through alternative coordination operation of the modules in the power conversion system. As compared to the existing solution, the control method of the disclosure is simple and reliable and has a low requirement for a communication rate while having no influence on control performance such as voltage balance and current sharing of the system.

The disclosure determines operating modules through comparison between the modulation wave and the carrier waves, and all power modules alternatively switch in a certain sequence and have stronger voltage balancing capability of a dc-link voltage while having no influence on system power transmission. The disclosure is applicable to the power conversion system having multiple modules connected in parallel, for example, including, but not limited to a data center, a charging station, an energy storage system and micro-grid, or the like.

Exemplary embodiments of the disclosure have been shown and described in detail. It shall be understood that the disclosure is not limited to the disclosed embodiments. Instead, the disclosure intends to cover various modifications and equivalent settings included in the spirit and scope of the appended claims.

What is claimed is:

1. A method for controlling a power conversion system, wherein the power conversion system comprises N power modules connected in parallel, where N is a positive integer, the method comprising:

step S1, configuring a carrier period of the N power modules, and configuring carrier waves of any adjacent power modules to shift $2\pi/N$ with respect to each other;

step S2, selecting M power modules to run within the carrier period, where $0 \leq M \leq N$, and providing a modulation wave to the N power modules, an amplitude of the modulation wave being A/N of a carrier peak of the carrier waves, wherein when the power conversion system is in a steady state, A=M, and when the power conversion system is not in a steady state, M is equal to A after rounding;

step S3, comparing the value of the modulation wave with a value of the carrier wave of each of the power modules, respectively, wherein, when the value of the modulation wave is greater than the value of the carrier wave, the corresponding power module runs;

when the value of the modulation wave is less than or equal to the value of the carrier wave, the corresponding power module stops.

2. The method for controlling a power conversion system according to claim 1, wherein a running time for each of the power modules is the same within one carrier period.

3. The method for controlling a power conversion system according to claim 1, wherein in the step S2, a method for selecting the number M of running power modules comprises:

determining a best efficiency point (BEP) power $P_{opt}$ corresponding to the BEP of the power modules;

calculating a ratio of a total system power $P_o$ of the power conversion system to the BEP power $P_{opt}$ and rounding the ratio to obtain a calculated operating value $M_{cal}$; and determining the number $M=M_{cal}$ or $M_{cal}+1$ of running power modules according to a principle that an operating power of an individual power module is closest to the BEP.

4. The method for controlling a power conversion system according to claim 3, wherein the number M of running power modules is determined as follows:

$$M_{cal} = \text{floor}\left(\frac{P_o}{P_{opt}}\right), \text{ wherein if}$$

$$\left|P_{opt} - \frac{P_o}{M_{cal}}\right| > \left|P_{opt} - \frac{P_o}{(M_{cal} + 1)}\right|, \text{ then}$$

$$M = M_{cal} + 1, \text{ or } M = M_{cal}.$$

5. The method for controlling a power conversion system according to claim 1, wherein each of the power modules comprises a first port, and the first ports of the N power modules are connected in parallel.

6. The method for controlling a power conversion system according to claim 1, wherein each of the power modules is a one-stage power module having one-stage power conversion units.

7. The method for controlling a power conversion system according to claim 1, wherein each of the power modules is a two-stage power module having first-stage power conversion units and second-stage power conversion units in cascade connection, wherein when the power modules run or stop, either the first-stage power conversion units or the second-stage power conversion units run or stop, or both the first-stage power conversion units and the second-stage power conversion units run or stop simultaneously.

8. The method for controlling a power conversion system according to claim 1, wherein when one of the power modules is selected to run, it is in a burst mode.

9. The method for controlling a power conversion system according to claim 1, wherein the control method is implemented by a centralized controller, wherein the centralized controller is configured to generate N carrier waves having a phase shift of $2\pi/N$ according to the total number N of current power modules, calculate the number M of running power modules, generate the modulation wave, compare the modulation wave with the carrier waves respectively to generate corresponding drive signals, and send the generated drive signals to respective power modules.

10. The method for controlling a power conversion system according to claim 1, wherein the control method is implemented by a plurality of control chips distributed in the respective power modules, wherein the control chips are configured to generate N carrier waves having a phase shift of $2\pi/N$ according to ID numbers of power modules, synchronizing signals of the modules, and the total number N, determine the number M of running power modules according to local calculation or communication, generate the modulation wave, and compare the modulation wave with the carrier waves to generate corresponding drive signals.

11. A control device for a power conversion system, wherein the power conversion system comprises N power modules connected in parallel, where N is a positive integer, wherein the control device comprises at least one control unit for controlling the N power modules, wherein the at least one control unit comprises:

a carrier generating unit for generating N carrier waves, wherein a phase shift between the carrier waves of any adjacent power modules is $2\pi/N$;

a module number selecting unit for selecting M power modules to run within a carrier period of the N power modules, where 0≤M≤N, and providing a modulation wave to the N power modules, an amplitude of the modulation wave being A/N of a carrier peak of the carrier waves, wherein when the power conversion system is in a steady state, A=M, and when the power conversion system is not in a steady state, M is equal to A after rounding; and a comparing unit for comparing the value of the modulation wave with a value of the carrier wave of each of the power module respectively, wherein when the value of the modulation wave is greater than the value of the carrier wave, the corresponding power module runs, and when the value of the modulation wave is less than or equal to the value of the carrier wave, the corresponding power module stops.

12. The control device for a power conversion system according to claim 11, wherein a running time for each of the power modules is the same within one carrier period.

13. The control device for a power conversion system according to claim 11, wherein the module number selecting unit determines a best efficiency point (BEP) power $P_{opt}$ corresponding to the BEP of the power modules; calculates a ratio of a total system power $P_o$ of the power conversion system to the BEP power $P_{opt}$ and rounds the ratio to obtain a calculated operating value $M_{cal}$; and determines the number $M=M_{cal}$ or $M_{cal}+1$ of running power modules according to a principle that an operating power of an individual power module is closest to the BEP.

14. The control device for a power conversion system according to claim 13, wherein the number M of running power modules is determined by the module number selecting unit as follows:

$$M_{cal} = \text{floor}\left(\frac{P_o}{P_{opt}}\right), \text{ wherein if}$$

$$\left|P_{opt} - \frac{P_o}{M_{cal}}\right| > \left|P_{opt} - \frac{P_o}{(M_{cal}+1)}\right|, \text{ then}$$

$$M = M_{cal} + 1, \text{ or } M = M_{cal}.$$

15. The control device for a power conversion system according to claim 11, wherein each of the power modules comprises a first port, and the first ports of the N power modules are connected in parallel.

16. The control device for a power conversion system according to claim 11, wherein each of the power modules is a one-stage power module having one-stage power conversion units.

17. The control device for a power conversion system according to claim 11, wherein each of the power modules is a two-stage power module having first-stage power conversion units and second-stage power conversion units in cascade connection, wherein when the power modules run or stop, either the first-stage power conversion units or the second-stage power conversion units run or stop, or both the first-stage power conversion units and the second-stage power conversion units run or stop simultaneously.

18. The control device for a power conversion system according to claim 11, wherein when one of the power modules is selected to run, it is in a burst mode.

19. The control device for a power conversion system according to claim 11, wherein the at least one control unit is configured to be a centralized controller, wherein the centralized controller is configured to generate N carrier waves having a phase shift of 2π/N according to the total number N of the present power modules by the carrier generating unit, calculate the number M of running power modules and generate the modulation wave by the module number calculating unit, and compare the modulation wave with the carrier waves to generate corresponding drive signals and send the generated drive signals to respective power modules by the comparing unit.

20. The control device for a power conversion system according to claim 11, wherein the at least one control unit is configured to comprise a plurality of control chips distributed in the respective power modules, wherein the control chips generate N carrier waves having a phase shift of 2π/N according to ID numbers of power modules, synchronizing signals of the modules, and the total number N by the carrier generating unit, determine the number M of running power modules according to local calculation or communication and generate the modulation wave by the module number calculating unit, and compare the modulation wave with the carrier waves to generate corresponding drive signals by the comparing unit.

* * * * *